March 9, 1954  F. J. VAN SCOY ET AL  2,671,893
COMBINED ENGINE OIL LEVEL AND FLOW RESPONSIVE INDICATOR
Filed May 29, 1953  2 Sheets-Sheet 1

INVENTORS
THOMAS A. VAN SCOY,
FRANK J. VAN SCOY,
BY McMorrow, Berman + Davidson
ATTORNEYS.

March 9, 1954 F. J. VAN SCOY ET AL 2,671,893
COMBINED ENGINE OIL LEVEL AND FLOW RESPONSIVE INDICATOR
Filed May 29, 1953 2 Sheets-Sheet 2

INVENTORS
THOMAS A. VAN SCOY,
FRANK J. VAN SCOY,
BY

McMorrow, Berman + Davidson
ATTORNEYS.

Patented Mar. 9, 1954

2,671,893

UNITED STATES PATENT OFFICE 2,671,893

COMBINED ENGINE OIL LEVEL AND FLOW RESPONSIVE INDICATOR

Frank J. Van Scoy and Thomas A. Van Scoy, Wilkes-Barre, Pa.

Application May 29, 1953, Serial No. 358,238

3 Claims. (Cl. 340—220)

This invention relates to an indicator for informing an operator of the condition of the lubricating oil in an internal combustion engine and more particularly to a device for indicating both a condition of insufficient lubricating oil and a condition of insufficient oil pressure in an internal combustion engine during operation of the engine.

It is among the objects of the invention to provide an improved electrically actuated indicator which can be connected into the pressure lubricating system of an internal combustion engine and will energize a signal device, such as a signal lamp, whenever the supply of lubricating oil in the engine falls below a safe level or the pressure of the oil in the engine lubricating system falls below a safe value while the engine is operating; which utilizes current from the engine electrical system only when the engine is operating and the quantity or pressure of the lubricating oil becomes dangerously low; which is adjustable to indicate any predetermined departure of the oil quantity from the normal or safe level; and which is simple and durable in construction, economical to manufacture, easy to install, and reliable in operation.

Other objects and advantages will become apparent from a consideration of the following description and the appended claims in conjunction with the accompanying drawings, wherein:

Figure 1:
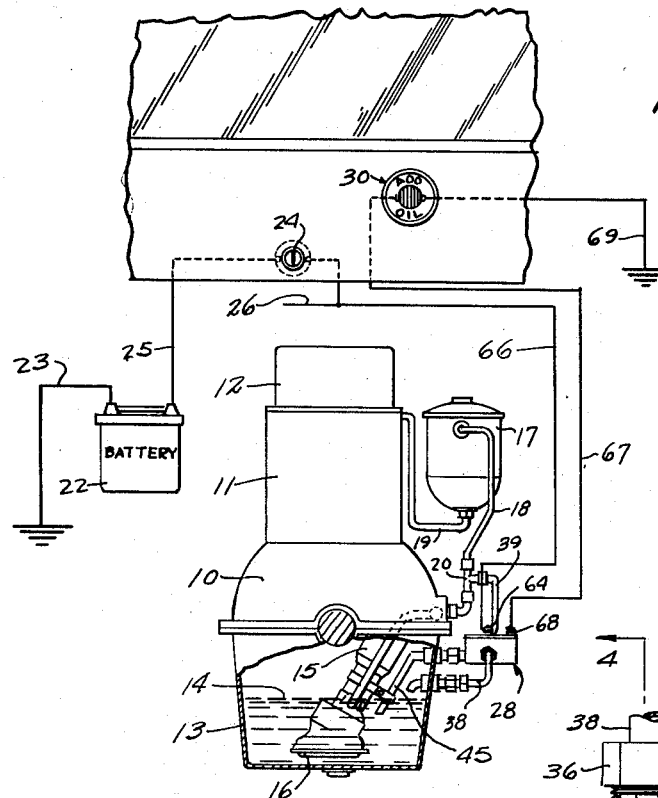
Figure 1 is a diagrammatic end elevational view of an internal combustion engine and the electrical system therefor with a portion of the engine broken away and shown in cross section and with an oil condition indicator illustrative of the invention applied to the engine.
Figure 2:
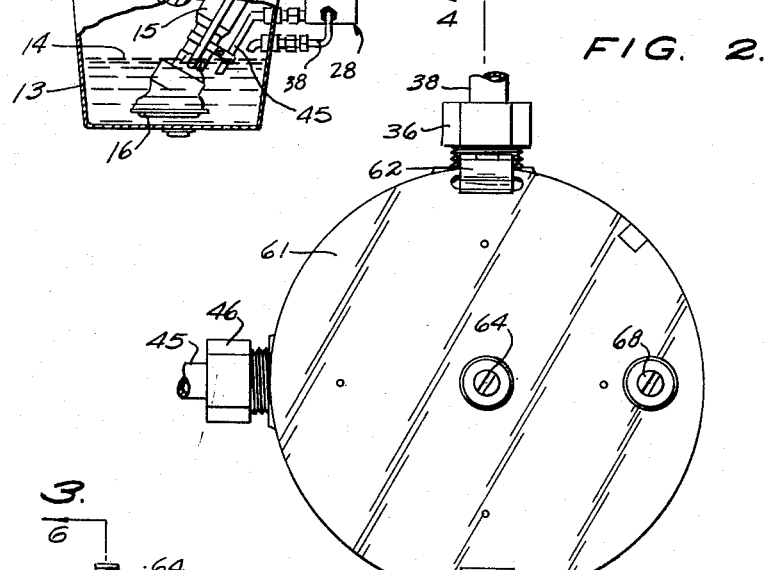
Figure 2 is a top plan view on an enlarged scale of a switch assembly constituting a portion of the oil condition indicating apparatus.
Figure 3:
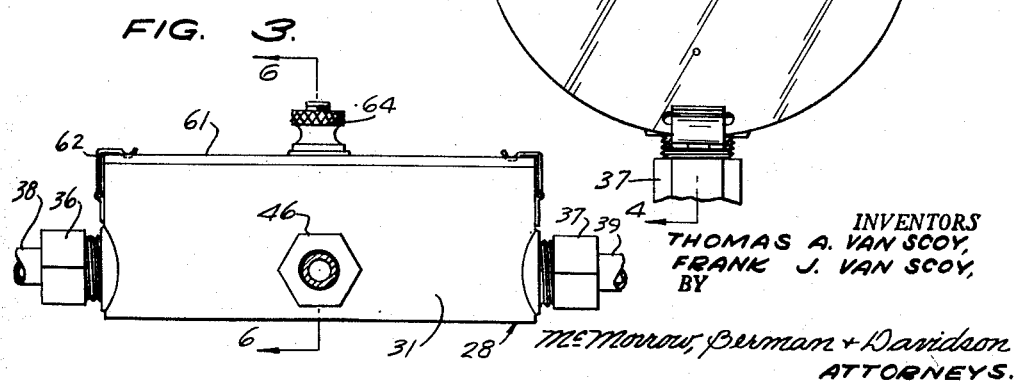
Figure 3 is a side elevational view of the switch assembly illustrated in Figure 2.
Figure 4:
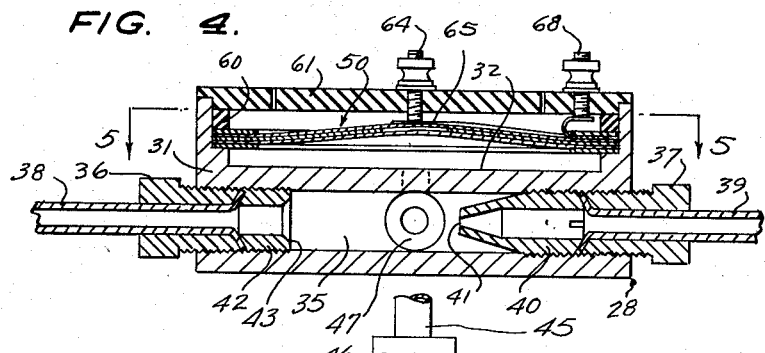
Figure 4 is a cross sectional view on the line 4—4 of Figure 2.
Figure 5:
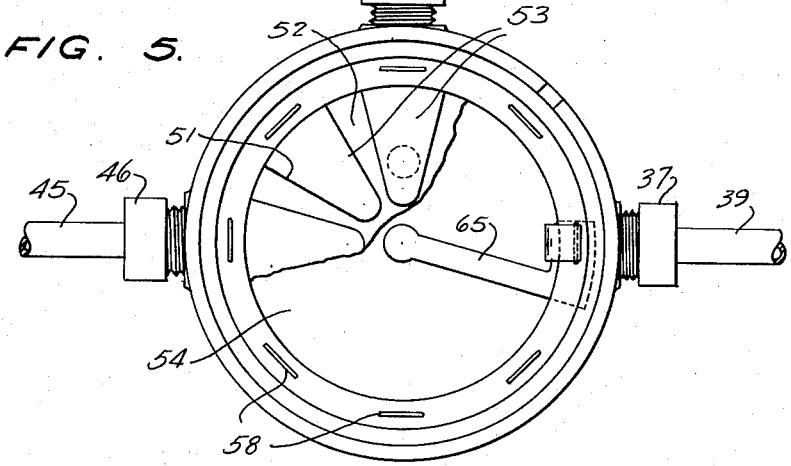
Figure 5 is a cross sectional view on the line 5—5 of Figure 4.
Figure 6:
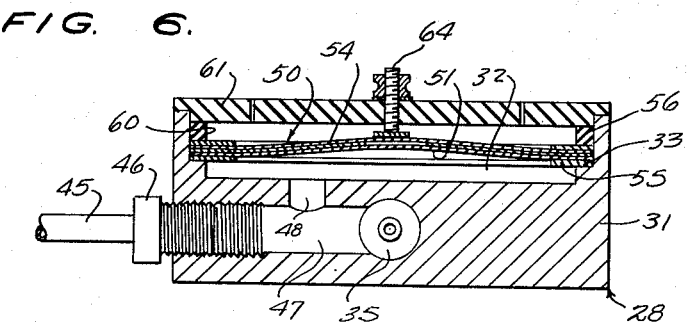
Figure 6 is a cross sectional view on the line 6—6 of Figure 3.

With continued reference to the drawings, the engine diagrammatically illustrated may be a conventional internal combustion engine such as is commonly used for the propulsion of automotive vehicles, aircraft and boats, and includes a crank case 10, a cylinder block 11 mounted on the crank case, a cylinder head 12 mounted on the cylinder block, an oil pan 13 secured to the crank case 10 in closing relationship to the open, bottom side of the crank case and containing a supply 14 of lubricating oil for the lubrication of the engine and a lubricating system including a pressure pump 15 driven by the engine in a well known manner and having an intake structure 16 extending downwardly in the oil pan 13 to a location near the bottom of the oil pan, an oil filter 17 mounted on the engine and connected by a conduit 18 to the outlet of the engine lubricating oil pump 15, the filter being connected to the lubricating system of the engine by means including the conduit 19, and the oil being returned from the engine lubricating system to the engine oil pan in the well known manner. The oil pump has a capacity much greater than the requirements of the engine lubricating system when the engine is in good mechanical condition and the excess oil delivered by the pump is returned to the oil pan through a pump pressure regulating valve in a manner well known to the art.

The engine has an electrical system including a storage battery 22 charged from the conventional, engine-driven generator, and grounded at one side, as indicated at 23, an ignition switch 24 connected by a conductor 25 to the ungrounded side of the battery 22 and a conductor 26 connecting the other side of the ignition switch to the electric ignition system of the engine.

As internal combustion engines together with their lubrication systems and electrical systems are well known to the art, a more detailed illustration and description of the engine, its lubrication system and its electrical system is considered unnecessary for the purposes of the present disclosure.

The oil condition indicator of the present invention comprises a pressure switch assembly, generally indicated at 28, disposed adjacent the engine oil pan 13 and an electrically actuated signal device, such as the signal lamp generally indicated at 30, mounted adjacent the ignition switch 24 of the engine.

The switch assembly 28 comprises a switch housing 31, formed of a suitable material such as metal, and of cylindrical shape having a length materially less than its diameter. This housing has in one end a recess 32 of circular shape having a diameter materially less than the length of the housing and having intermediate its depth an annular shoulder 33.

A fluid passage 35 of cylindrical shape extends diametrically through the portion of the housing 31 between the bottom of the recess 32 and the end of the housing remote from the recess and fittings 36 and 37 are threaded into the respectively opposite ends of the passage 35 and receive the adjacent ends of tubular conduits 38 and 39. The conduit 39 is connected into the conduit 39 leading from the oil pump outlet to the oil filter 17 by suitable means, such as the T-fitting 20, and the conduit 38 extends from the fitting 36 through an aperture in the side wall of the engine oil pan 13 to the interior of the oil pan. A venturi or injector mechanism is disposed in the passage 35 and comprises a tubular nozzle 40 threaded into the passage 35 at the inner end of the fitting 37 and having at its end remote from the fitting 37 a restricted orifice 41 and a sleeve 42 threaded into the passage 35 at the inner end of the fitting 36 and having at its end remote from the fitting 36 a flared or streamlined open end 43 which receives the jet of oil directed into the sleeve from the orifice 41 of the nozzle 40 when lubricating oil under pressure is forced through the conduit 39 and through the nozzle 40.

This injector or Venturi structure creates a reduced pressure in the passage 35 when the engine is operating and forcing lubricating oil under a predetermined pressure through the nozzle 40, the orifice of the nozzle 40 being so restricted that there is no noticeable reduction of the engine oil pressure because of the lubricating oil directed through the pressure-operated switch means.

A conduit 45 extends through the wall of the oil pan 13 through which the tube 38 extends and has its end disposed within the oil pan located at a distance above the bottom of the oil pan corresponding to the safe level of lubricating oil in the oil pan. At its other end this conduit 45 is connected to a tube fitting 46 threaded into the outer end of a branch passage 47 which is disposed radially of the portion of the housing 31 between the recess 32 and the end of the housing remote from the recess and perpendicular to the passage 35.

With this arrangement, as long as the end of the conduit 45 disposed within the oil pan 13 is covered by the lubricating oil in the oil pan, air cannot flow into the conduit 45 and the pressure reduction will be maintained in the passage 35 by the injector mechanism described above. If, however, the end of the conduit 45 within the oil pan is uncovered by the lubricating oil in the oil pan air will then flow through the conduit 45 into the passage 35 and relieve the pressure reduction created by the injector mechanism, restoring the pressure in the passages 35 and 47 to atmospheric pressure. A passage or aperture 48 in the housing connects the passage 47 to the recess 32 at the bottom of the recess so that whatever fluid pressures are present in the passages 35 and 47 will also be present in the inner portion of the recess 32.

A composite diaphragm 50 of circular shape is disposed in the recess 32 and marginally supported on the annular shoulder 33 intermediate the depth of the recess. This diaphragm comprises a spring member 51 formed of resilient metal shim stock having radial, spoke-like portions 52 cut out at equal angular intervals therearound to provide a plurality of angularly spaced apart spring fingers 53 inwardly directed from a marginal ring portion to a central opening in the plate. This plate is disposed at the side of the diaphragm nearest the bottom of the recess 32 and is arched or bowed so that its center is normally further away from the bottom of the recess than its marginal or peripheral portion. A covering 54 of circular shape formed of oil-resistant and air-impervious material covers the spring member 51 and flat rings 55 and 56 of suitable gasket material, such as wax-impregnated cardboard, are disposed at the respectively opposite sides of the spring and cover assembly and extend around the marginal portions of the spring and cover. The gaskets, the spring and the cover are secured together by suitable stitching or stapling, as indicated at 58, extending through the gaskets, the spring and the cover at substantially equal angular intervals around the gaskets and a sealing ring 60 is disposed on the marginal portion of the gasket 56 remote from the annular shoulder 33 in opposition to the shoulder 33. A disc-shaped cover 61 is mounted on the housing 31 in covering relationship to the open end of the recess 32 and is detachably secured to the housing by suitable means, such as the spring clips 62.

A contact screw 64 extends through the center of the cover 61 and a contact strip 65 is disposed radially of the diaphragm 50 with its inner end disposed in alignment with the inner end of contact screw 64 and is electrically insulated from the housing 31.

This pressure switch mechanism is normally closed, the inner end of the contact strip 65 contacting the inner end of the contact screw 64 when the pressure in the cavity 32 between the diaphragm 50 and the bottom of the cavity is substantially atmospheric and the switch is opened when the pressure between the diaphragm and the bottom of the cavity is reduced below atmospheric by the action of the injector means pulling the diaphragm toward the bottom of the cavity and the contact strip away from the inner end of the screw 64.

A conductor 66 leads from the ignition conductor 26 to the contact screw 64 and a conductor 67 leads from a terminal 68 connected to the contact strip 65 and insulated from the housing 31 to one side of the signal lamp 30, the other side of this lamp being grounded, as indicated at 69.

The contact strip 65 is electrically insulated from the housing 31 by being disposed between the cover 54 and the gasket 56 and the cover 61 of the housing in which the terminals 64 and 68 are mounted is preferably formed of electrically insulative material.

With this arrangement, when the level of the oil in the oil pan 13 of the engine falls below the end of the conduit 45 disposed within the oil pan or when the oil pressure in the engine lubricating system falls below a predetermined value, the diaphragm 50 is freed to move the contact strip 65 into electrically conductive contact with the terminal screw 64 thereby illuminating the signal light 30 and providing a warning to the operator that there is an unsafe quantity of oil in the engine or that the engine lubricating system is operating at an unsafe pressure.

When the ignition switch is first turned on to start the engine, the signal light will be illuminated and this will provide an indication to the operator that the signal is in operative condition. As soon however as the engine begins operation the signal light will be extinguished if there is sufficient oil in the engine and the oil pressure in the lubricating system is at the proper value.

The invention may be embodied in other specific forms without departing from the spirit or essential characteristics thereof. The present embodiment is, therefore, to be considered in all respects as illustrative and not restrictive, the scope of the invention being indicated by the appended claims rather than the foregoing description, and all changes which come within the meaning and range of equivalency of the claims are, therefore, intended to be embraced therein.

What is claimed is:

1. In combination with an internal combustion engine having an oil pan for lubricating oil and a pressure lubricating system, means for indicating an insufficient quantity of lubricating oil in the engine oil pan comprising a housing, a normally closed pressure switch connected to said housing, a conduit having one end disposed in said oil pan at a location at which the lubricating oil in said oil pan covers said one end of the conduit when the oil is above a predetermined level and uncovers said one end of the conduit when the oil in said oil pan is below a predetermined level, said conduit communicating at its other end with the interior of said housing, injector means disposed in said housing and connected at its inlet end to said pressure lubricating system and at its outlet end to said oil pan and effective to maintain a reduced pressure in said housing while the associated engine is operating and maintaining a predetermined oil pressure in said lubricating system and said one end of said conduit is closed, said conduit being effective to admit air into said housing and disable said injector means to maintain a reduced pressure in said housing when said one end of said conduit is uncovered, said pressure switch being maintained open as long as said injector means maintains a reduced pressure in said housing, an electrically operated signal device, and an energizing circuit for said signal device including said pressure switch whereby said signal device will be actuated if the oil level in said oil pan falls below said one end of said conduit or the oil pressure in said engine lubricating system falls below said predetermined value.

2. In combination with an internal combustion engine having an oil pan and a pressure lubricating system and an engine electric system including a source of electrical energy and an engine ignition switch connected at one side to said source of electrical energy, means for indicating an unsafe condition of the engine lubricating oil comprising a housing disposed adjacent the engine, means in said housing connected between said pressure lubricating system and the interior of said oil pan effective to maintain a pressure below atmospheric pressure in said housing when the engine is operating, the oil pressure in said pressure lubricating system is above a predetermined value and the oil in said oil pan is above a predetermined level, a resiliently closed pressure operated switch responsive to the pressure in said housing to remain open while the pressure in said housing is below atmospheric pressure, an electrically actuated signal device, an energizing circuit for said signal device extending from the other side of said ignition switch and including said pressure operated switch and actuating said signal device whenever said ignition switch is closed and said pressure operated switch closes in response to the existence of substantially atmospheric pressure in said housing, and means extending from the interior of said oil pan into said housing and effective to restore the pressure in said housing substantially to atmospheric pressure whenever the level of the lubricating oil in said oil pan falls below a predetermined level.

3. In combination with an internal combustion engine having an oil pan and a pressure lubricating system, means for indicating an unsafe condition of the engine lubricating oil comprising a housing disposed adjacent the engine, means in said housing connected between said pressure lubricating system and the interior of said oil pan effective to maintain a pressure below atmospheric pressure in said housing when the engine is operating, the oil pressure in said pressure lubricating system is above a predetermined value and the oil in said oil pan is above a predetermined level, a resiliently closed pressure operated switch responsive to the pressure in said housing to remain open while the pressure in said housing is below atmospheric pressure, an electrically actuated signal device, an energizing circuit for said signal device including said pressure operated switch and actuating said signal device whenever said circuit is otherwise closed and said pressure operated switch closes in response to the existence of substantially atmospheric pressure in said housing, and means extending from the interior of said oil pan into said housing and effective to restore the pressure in said housing substantially to atmospheric pressure whenever the level of the lubricating oil in said oil pan falls below a predetermined level.

FRANK J. VAN SCOY.
THOMAS A. VAN SCOY.

References Cited in the file of this patent

UNITED STATES PATENTS

| Number | Name | Date |
|---|---|---|
| 1,582,154 | Zeiher et al. | Apr. 27, 1926 |
| 1,769,673 | Blaschke | July 1, 1930 |
| 2,351,408 | De Beaumont | June 13, 1944 |
| 2,582,483 | Hallerberg | Jan. 15, 1952 |
| 2,588,761 | Roby | Mar. 11, 1952 |